United States Patent Office 3,478,029
Patented Nov. 11, 1969

3,478,029
O-PYRAZOLO-(1,5-A)-PYRIMIDYL-PHOSPHORUS ACID ESTERS
Hans Gerd Schicke, deceased, late of Bochum, Germany, by Emil Schicke and Helene Schicke, heirs, Bochum, and Ingeborg Hammann, Cologne, Germany, assignors to Farbenfabriken Bayer Aktiengesellschaft, Leverkusen, Germany, a corporation of Germany
No Drawing. Filed May 31, 1966, Ser.No. 554,204
Claims priority, application Germany, June 2, 1965, F 46,221
Int. Cl. C07f 9/16
U.S. Cl. 260—256.5
10 Claims

ABSTRACT OF THE DISCLOSURE

O-[6-halo- and 6-mercapto- substituted pyrazolo-(1,5-a)-pyrimidyl]-phosphorus acid esters which possess biocidal, especially pesticidal, properties and which may be produced by conventional methods.

---

The present invention relates to particular new phosphorous-containing esters, to their biocidal compositions with dispersible carrier vehicles, as well as to processes for the preparation and use thereof.

It is an object of the present invention to provide particular new O-[6-halo- and 6-mercapto-substituted pyrazolo(1,5-a)-pyrimidyl]-phosphorous acid esters which possess valuable biocidal, especially pesticidal, properties; to provide active compositions in the form of mixtures of such compounds with liquid and solid dispersible carrier vehicles; to provide processes for producing such compounds; and to provide methods of using such compounds in a new way, especially for combating pests, such as insects, acarids, intestinal worms, and the like.

Other and further objects of the present invention will become apparent from a study of the within specification and accompanying examples.

It has been found in accordance with the present invention that the particular new O-[6-halo- and 6-mercapto-substituted pyrazolo-(1,5-a)-pyrimidyl]-phosphorus acid esters having the formula:

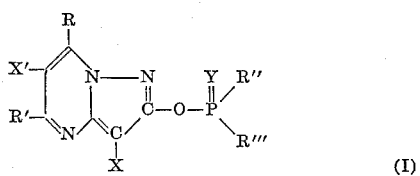

in which R and R' each respectively represents a member selected from the group consisting of hydrogen and alkyl having 1 to 3 carbon atoms, R" represents a member selected from the group consisting of alkyl having 1 to 4 carbon atoms, alkoxy having 1 to 4 carbon atoms, and phenyl, R''' represents a member selected from the group consisting of alkyl having 1 to 4 carbon atoms and alkoxy having 1 to 4 carbon atoms, Y represents a member selected from the group consisting of oxygen and sulfur, X represents a member selected from the group consisting of hydrogen and halogen, and X' represents a member selected from the group consisting of halogen, alkylmercapto having 1 to 4 carbon atoms, phenyl mercapto, chlorophenyl mercapto, dichlorophenyl mercapto, nitrophenyl mercapto, and methylphenyl mercapto, possess valuable biocidal properties.

It has been found further found in accordance with the present invention that the particular new compounds of general Formula I above may be obtained in a smooth reaction and with very good yields, by the process which comprises reacting a phosphorus-containing halide having the general formula:

in which R", R''' and Y are the same as defined above and Hal represents a halogen atom, such as chlorine, bromine, iodine, and fluorine, especially chlorine, in the presence of an acid-binding agent, with a pyrazolo-(1,5-a)-pyrimidine having the general formula:

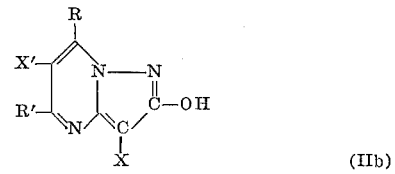

in which R, R', X and X' are the same as defined above.

The process according to the present invention is preferably carried out in the presence of inert organic solvents. Lower aliphatic ketones, such as acetone, methyl ethyl ketone, methylisopropyl ketone and methyl isobutyl ketone, as well as nitriles, such as acetonitrile and propionitrile, and also hydrocarbons, such as benzene, toluene and the xylenes, have proved to be especially satisfactory solvents.

The reaction is expediently carried out at temperatures substantially between about 20° C. and the boiling point of the reaction mixture, preferably at about 25 to 80° C. In order to achieve good yields and to obtain pure products, it has also proved advantageous to continue stirring the reaction mixture for some time (about 1 to 12 hours) after the starting components have been mixed together, while heating at the stated temperature.

As acid-binding agents in this regard, there may be used, in particular, alkali metal alocholates or carbonates, as well as tertiary amines, such as pyridine, triethylamine and diethylaniline.

It will be appreciated that instead of working in the presence of the acid-binding agents mentioned above, it is also possible to start from the corresponding salts, preferably the alkali metal or ammonium salts, of the pyrazolo-(1,5-a)-pyrimidines of Formula IIb above and to react these with the halides of Formula II above.

The pyrazolo-(1,5-a)-pyrimidines of Formula IIb above required as starting materials for carrying out the production process according to the present invention have not been described heretofore in the literature but they can be prepared by the condensation of the appropriate dicarbonyl compounds of general Formula IIc with the corresponding amino-pyrazolones of general Formula IId according to the following equation:

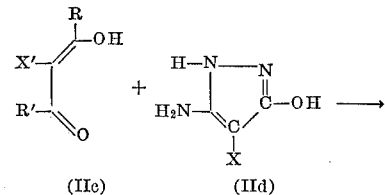

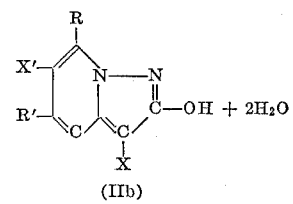

in which R, R', X and X' are the same as defined above.

The particular new esters according to the present invention are usually obtained in the form of crystalline substances which have a sharp melting point and can easily be further purified, if necessary, by recrystallization from conventional solvents. However, some of the instant esters are viscous oils which cannot be distilled, even under strongly reduced pressure.

The particular new esters of the present invention are characterized advantageously by outstanding biocidal properties. In this regard, the instant esters have an excellent insecticidal, acaricidal and anthelmintic activity but only a low toxicity towards warm-blooded animals and a low phytotoxicity. Besides their action against sucking and biting insects, for example, aphids and caterpillars, and against Diptera, the excellent activity of the instant biocidally active products against ecto- and endoparasites attacking large animals, especially against ticks, blowflies, scab mites, as well as stomach and intestinal worms, for example, *Haemonchus contortus,* is to be especially emphasized.

The sucking insects which are contemplated herein essentially include aphids, such as the peach aphid (*Myzus persicae*) and the black bean aphid (*Doralis fabae*); coccids, such as *Aspidiotus hederae, Lecanium hesperidum* and *Pseudococcus maritimus;* Thysanoptera, such as *Hercinothrips femoralis;* and bugs, such as the beet bug (*Piesma quadrata*) and the bed bug (*Cimex lectularius*); and the like.

The biting insects which may be considered in this connection essentially include buterfly larvae, such as *Plutella maculipennis* and *Lymantria dispar;* bettles, such as grain weevils (*Sitophilus granarius*) and the Colorado bettle (*Leptinotarsa decemlineata*), but also species living in the soil, such as wire worms (*Agriotes sp.*) and the cockchafer larvae (*Melolonthat melolantha*); cockroaches, such as the German cockroach (*Blatella germanica*); Orthoptera, such as the cricket (*Gryllus domesticus*); termites, such as Reticulitermes; and Hymenoptera, such as ants; and the like.

The Diptera contemplated mainly comprise the flies, such as the fruitfly (*Drosophila melanogaster*), the Mediterranean fruitfly (*Ceratitits capitata*), the house fly (*Musca domestica*), and gnats, such as the mosquito (*Aedes Aegypti*), as well as bluebottle flies, such as the gold fly (*Lucilia sericata*) and *Chrysomya chloropyga;* and the like.

Among the mites coming into consideration, the spider mites (*Tetranychidae*) are of special importance, such as the common spider mite (*Tetranychus urticae*) and the fruit tree spider mite (*Paratetranychus pilosus*); gall mites, such as the red currant gallmite (*Eriophyes ribis*) and tarsonemides, such as *Tarsonemus pallidus;* and also ticks, such as *Boophilus microplus;* and the like.

The particular new esters according to the present invention are therefore advantageously usable broadly as pest control agents, especially in plant protection and in the fields of veterinary medicine and hygiene.

Thus, the new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose; dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: smulsifying agents, such as non-ionic and anionic emulsifying agents (for instance, poly-ethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, such as other biocides, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.00001 and 20%, preferably 0.0001 and 10%, by weight of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.00001 and 95% by weight of the mixture.

Furthermore, the present invention contemplates methods of combating pests, especially insects and acarids, and/or intestinal worms, which comprise applying to at least one of (a) such pests and (b) their habitat, a pesticidally, especially insecticidally and/or acaricidally, and/or anthelmintically, effective amount of the particular active compound of the invention alone or together with a carrier vehicle, as noted above. The instant formulations or compositions are applied in the usual manner, for example, by spraying, atomizing, vaporizing, scattering, dusting, watering, sprinkling, fumigating, and the like. It will be realized in accordance with the present invention that the instant compounds may be used effectively not only in plant protection, but also in hygiene control, especially against insects and acarids and intestinal worms.

The outstanding biological, i.e. biocidal, properties of the particular new compounds of the present invention, when applied against various types of insect pests, can be seen, by way of illustration and not limitation, from the following tests results:

EXAMPLE 1

To produce a suitable preparation of the particular active compound, one part by weight of such active compound is mixed with 3 parts by weight of acetone or dimethyl formamide as auxiliary solvent, then one part by weight of a commercial non-ionic emulsifier based on aryloxy polyglycol ether is added to the preliminary mixture thus formed, and the resulting concentrate is finally diluted with water to the desired final concentration of the given active compound.

Test for activity against ticks

Ten female ticks of the species *Boophilus microplus* are placed on a small cotton pad which is subsequently immersed in the preparation of the given active compound produced as described above, removed from the solution after one minute and placed in a glass dish containing filter paper. The ticks are then removed from the cotton pad and placed on dry filter paper.

Evaluation is carried out after 72 hours, by determining the degree of destruction percentage wise: 100% indicates that all the ticks are killed, whereas 0% indicates that none are killed.

The particular active compounds employed, their concentrations and the results obtained can be seen from the following Table 1.

TABLE 1

| Active compound (constitution) | Concentration of Active compound in percent | Degree of destruction after 72 hours in percent |
|---|---|---|
| (III) [structure: pyrazolopyrimidine with CH₃S, CH₃, CH₃, and S,P(OC₂H₅)₂ group] | 0.0005<br>0.00025 | 100<br>85 |
| (IV) [structure: pyrazolopyrimidine with CH₃S, CH₃, CH₃, and S,P(OC₂H₅)(C₂H₅)] | 0.0005<br>0.00025 | 100<br>55 |
| (V) [structure: pyrazolopyrimidine with C₂H₅S, CH₃, CH₃, and S,P(OC₂H₅)₂] | 0.0005<br>0.00025<br>0.0001 | 100<br>80<br>65 |
| (VI) [structure: pyrazolopyrimidine with Cl, CH₃, CH₃, and S,P(OC₂H₅)(C₂H₅)] | 0.00025<br>0.0001 | 100<br>70 |

EXAMPLE 2

Test for activity against caterpillars

Cabbage leaves (*Brassica oleracea*) are sprayed with a preparation of the given active compound produced as described in accordance with the procedure of Example 1 and are then infested with 10 caterpillars of the diamond-back moth (*Plutella maculipennis*), i.e., when the leaves sprayed are dew moist.

Evaluation is carried out after 4 days by determining the degree of destruction percentage-wise as noted in Example 1. The tested concentrations of the particular active compounds and the results obtained can be seen from the following Table 2.

TABLE 2

| Active compound (constitution) | Toxicity towards warm-blooded animals DL₅₀ on rats per os, mg./kg. | Concentration of active compound in percent | Degree of destruction after 4 days in percent |
|---|---|---|---|
| (A) [benzotriazinone-CH₂-S-P(=S)(OC₂H₅)₂]<br>(Control preparation, known from German Patent 927,270.) | 12.5 | 0.001<br>0.0001 | 100<br>0 |
| (VII) [pyrazolopyrimidine with Cl, CH₃, CH₃, Br, and S,P(OC₂H₅)₂] | 1,000 | 0.001<br>0.0001 | 100<br>80 |
| (VIII) [pyrazolopyrimidine with Cl, CH₃, CH₃, Br, and O,P(OC₂H₅)₂] | 100 | 0.001<br>0.0001 | 100<br>70 |

TABLE 2—Continued

| Active compound (constitution) | Toxicity towards warm-blooded animals DL$_{50}$ on rats per os, mg./kg. | Concentration of active compound in percent | Degree of destruction after 4 days in percent |
| --- | --- | --- | --- |
| (IX) 5-chloro-4,6-dimethyl-pyrazolo-pyrimidine with O,O-diethyl thiophosphate group | 100 | 0.001<br>0.0001 | 100<br>70 |
| (III') 5-methylthio-4,6-dimethyl-pyrazolo-pyridine with O,O-diethyl thiophosphate group | 100 | 0.001 | 100 |
| (IV') 5-methylthio-4,6-dimethyl-triazolo-pyrimidine with O-ethyl ethyl thiophosphate group | 25 | 0.0001 | 100 |

EXAMPLE 3

Test for activity against aphids (contact-insecticidal effect)

Cabbage plants (*Brassica oleracea*), which are heavily infested with peach aphids (*Myzus persicae*), are sprayed with a preparation of the given active compound produced as described in accordance with the procedure of Example 1 above until dripping wet.

Evaluation is carried out after 24 hours by counting the dead insects which are either on the surface of the soil or still on the plants. The degree of destruction is determined in the usual manner percentage-wise as noted in Example 1.

The active compounds tested, the concentration applied and the degree of destruction found can be seen from the following Table 3.

TABLE 3

| Active compound (constitution) | Toxicity towards warm-blooded aminals DL$_{50}$ on rats per os mg./kg. | Concentration of active compound in percent | Degree of destruction after 24 hours in percent |
| --- | --- | --- | --- |
| (A) (C$_2$H$_5$O)$_2$P(S)—S—CH$_2$—N-phthalazinone (Control preparation known from German Patent 927,270.) | 12.5 | 0.1<br>0.01 | 100<br>40 |
| (XI) 5-chloro-4,6-dimethyl-pyrazolo-pyrimidine with O,O-diethyl phosphate group | 100 | 0.01 | 100 |
| (V') 5-ethylthio-4,6-dimethyl-pyrazolo-pyrimidine with O,O-diethyl thiophosphate group | 250 | 0.01<br>0.001 | 100<br>95 |

| Active compound (constitution) | Toxicity towards warm-blooded aminals $DL_{50}$ on rats per os mg./kg. | Concentration of active compound in percent | Degree of destruction after 24 hours in percent |
|---|---|---|---|
| (X) 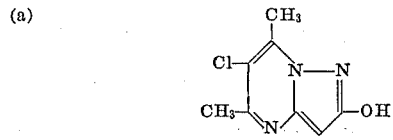 | 50 | 0.01<br>0.001 | 100<br>95 |
| (VI') 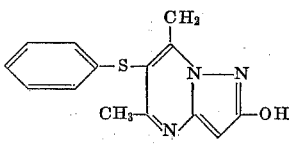 | ---------------- | 0.01<br>0.001 | 100<br>99 |
| (IV'') 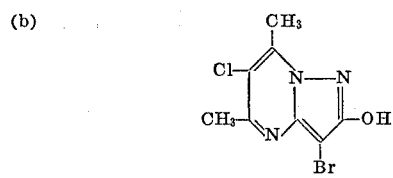 | 25 | 0.001<br>0.0001 | 100<br>40 |

The pyrazolo-(1,5-a)-pyrimidines required as starting materials for the preparation of the particular new compounds according to the present invention can be prepared in known manner, as follows:

(a) 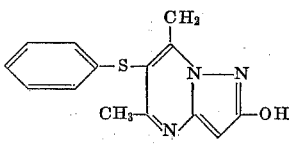 (IIba)

40 grams of chloroacetyl-acetone are added dropwise to a solution of 29.7 g. (0.3 mol) of 3-amino-pyrazolone-(5) in 250 cc. of glacial acetic acid at the boiling temperature of the mixture. Precipitation of crystals begins after only a few minutes. The reaction mixture is subsequently further heated at boiling temperature for one hour, then cooled to room temperature and the precipitated crystals filtered off with suction. The crystal mass is washed with water, isopropanol and ether. The yield is 43 g. (72.6% of theory) of a practically pure product of the above formula, i.e. 2-hydroxy-5,7-dimethyl-6-chloro-pyrazolo-(1,5-a)-pyrimidine. After recrystallization from dioxan, the compound has a melting point of 261 to 262° C.

(b)

(IIbb)

49.4 grams (0.25 mol) of 2-hydroxy-5,7-dimethyl-6-chloro-pyrazolo-(1,5-a)-pyrimidine are dissolved in 800 cc. of glacial acetic acid. 40 grams of bromine are added dropwise to this solution at 70° C. The mixture is stirred at 70 to 80° C. for 20 minutes and then mixed at this temperature dropwise with a solution of 20 g. of sodium hydroxide in 50 cc. water. The reaction mixture is subsequently stirred for a further 15 minutes at 70° C., cooled to room temperature and the resultant precipitate filtered off with suction. The precipitate is washed with water, isopropanol and ether.

The yield is 62 g. (89.5% of theory) and the melting point of the above compound, i.e. 2-hydroxy-3-bromo-5,7-dimethyl-6-chloro-pyrazolo-(1,5-a)-pyrimidine, is 214 to 216° C., after recrystallization from dioxan.

(c)

(IIbc)

A solution of 29.7 g. (0.3 mol) of 3-amino-pyrazolone-(5) and 62.4 g. of 3-phenylmercapto-pentane-2,4-dione (prepared from phenyl-sulfenic acid chloride and acetylacetone; B.P. 130° C./2 mm. Hg) in 250 cc. of glacial acetic acid is heated at boiling temperature for 2 hours. The reaction mixture is then cooled to room temperature and poured into water. The precipitated crystals are filtered off with suction, washed with a little isopropanol and ether and recrystallized from glacial acetic acid.

The yield is 65 g. (80% of theory). The compound of the above formula, i.e. 2-hydroxy-5,7-dimethyl-6-phenyl-mercapto-pyrazolo-(1,5-a)-pyrimidine, melts at 237 to 238° C.

The following compounds can be prepared in the same manner as described above:

Constitution (IIbd) 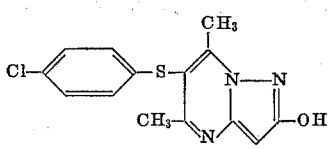

2-hydroxy-5,7 - dimethyl - 6 - p - chlorophenylmercapto-pyrazolo-(1,5-a)-pyrimidine, M.P. 267 to 268° C.

(IIbe) 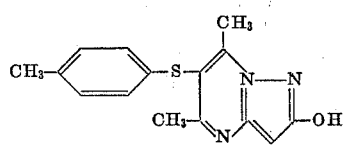

2-hydroxy - 5,7 - dimethyl-6-p-methylphenylmercapto-pyrazolo-(1,5-a)-pyrimidine, M.P. 255 to 256° C.

(IIbf)

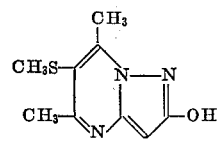

2-hydroxy-5,7-dimethyl-6-methylmercapto - pyrazolo-1,5-a)-pyrimidine, M.P. 248 to 249° C.

(IIbg)

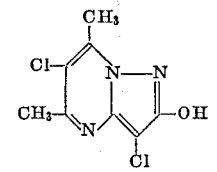

2-hydroxy-3,6-chloro-5,7-dimethyl-pyrazolo - (1,5-a)-pyrimidine, M.P. 267 to 268° C.

The following examples are given for the purpose of illustration, without limitation, of the production process of the present invention:

EXAMPLE 4

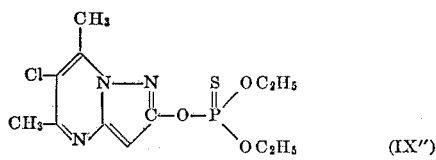
(IX'')

39.5 grams (0.2 mol) of 2-hydroxy-5,7-dimethyl-6-chloro-pyrazolo-(1,5-a)-pyrimidine are dissolved, together with 20.2 g. of triethylamine, in 300 cc. of acetonitrile. 37.7 grams of 0,0-diethyl-thionophosphoric acid chloride are added dropwise to this solution at room temperature. The resulting mixture is subsequently stirred at room temperature for 12 hours and then poured into water. The precipitated crystals are filtered off with suction, dried and recrystallized from ligroin. The product of the above formula, i.e., 0-[5,7-dimethyl-6-chloro-pyrazolo-(1,5-a)-pyrimid-2-yl]-0,0-diethyl-thionophosphoric acid ester, then melts at 83 to 84° C. The yield is 51 g. (73% of theory).

Analysis.—Calculated for a molecular weight of 349.5: P, 8.89%; S, 9.16%; Cl, 10.17%; N, 12.02%. Found: P, 9.13%; S, 9.56%; Cl, 10.61%; N, 12.04%.

The following compounds can be produced in a manner analogous to that described above:

Constitution　　　　　　　　Physical properties (VI''')

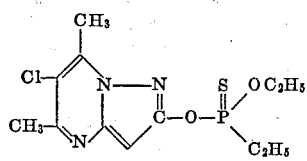

0-[5,7-dimethyl-6-chloro-pyrazolo - (1,5-a) - pyrimid - 2-yl]-ethyl-0-ethyl-thinophosphonic acid ester, M.P. 63 to 640 C.

(XI)

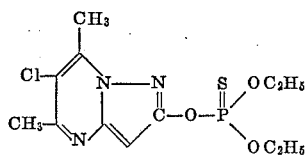

0-[5,7-dimethyl-6-chloro-pyrazolo - (1,5-a) - pyrimid - 2-yl]-0,0-diethyl-phosphoric acid ester, M.P. 67 to 68° C.

(XI'

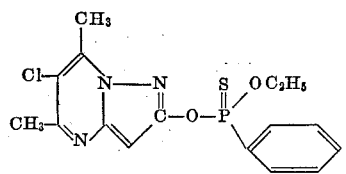

0-[5,7-dimethyl-6-chloro-pyrazolo - (1,5-a) - pyrimid - 2-yl]-phenyl-0-ethyl-thionophosphonic acid ester, M.P. 102 to 104° C.

(X')

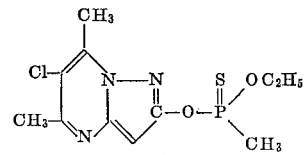

0-[5,7-dimethyl-6-chloro-pyrazolo - (1,5-a) - pyrimid - 2-yl-methyl - 0 - ethyl - thionophosphonic acid ester, $n_D^{25}$ 1.5868.

EXAMPLE 5

Constitution　　　　　　　　Physical properties (VII')

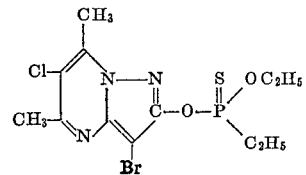

37.7 grams of 0,0-diethyl-thionophosphoric acid chloride are added dropwise at 25°C. to a solution of 55.3 g. (0.2 mol) of 2-hydroxy-3-bromo-5,7-dimethyl-6-chloro-pyrazolo-(1,5-a)-pyrimidine and 20.2 g. of triethylamine in 300 cc. of acetonitrile. The reaction mixture is subsequently stirred at 25°C. for 12 hours, then poured into water and the precipitated crystals are filtered off with suction. After drying, 79 g. (92.2% of theory) of the compound of the above formula, i.e., 0-[3-bromo-5,7-dimethyl-6-chloro-pyrazolo-(1,5-a)-pyrimid-2-yl] - 0,0-diethyl-thionophosphoric acid ester, are obtained in the form of colorless crystals which melt at 104 to 105°C., after recrystallization from ligroin.

Analysis.—Calculated for a molecular weight of 428.5: P, 7.25%; S, 7.48%; N, 9.81%; Cl, 8.30%; Br, 18.69%. Found: P, 7.38%; S, 7.89%; N, 10.26%; Cl, 8:75%; Br, 18.01%.

The following compounds can be prepared in an analogous manner:

Constitution　　　　　　　　Physical properties (XIII)

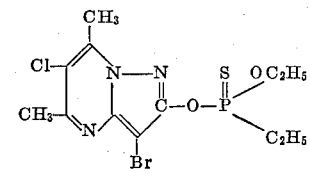

0-[3-bromo-5,7 - dimethyl - 6 - chloropyrazolo-(1,5-a)-pyrimid-2-yl]-ethyl-0-ethyl-thionophosphonic acid ester, M.P. 97 to 98°C.

Constitution

Physical properties (XIV)

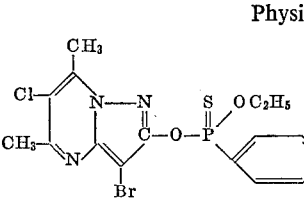

0 - [3 - bromo - 5,7 - dimethyl-6-chloro-pyrazolo-(1,5-a)-pyrimid-2-yl]-phenyl-0-ethyl-thionophosphonic acid ester, M.P. 116 to 117°C.

EXAMPLE 6

(XV)

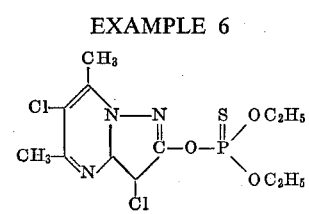

46.4 grams (0.2 mol) of 2-hydroxy-3,6-dichloro-5,7-dimethyl-pyrazolol(1,5-a)-pyrimidine and 20.2 g. of triethylamine are dissolved in 350 cc. of acetonitrile. 37.7 g. of 0,0-diethylthionophosphoric acid chloride are added dropwise to this solution at 25°C., and the reaction is subsequently stirred at 20°C., for 12 hours and then poured into about 1.5 liters of water. The precipitated crystals are filtered off with suction and dried. After recrystallization from ligroin, the product, i.e., 0-[3,6-dichloro - 5,7 - dimethyl-pyrazolo-(1,5-a)-pyrimid-2-yl]-0,0-diethyl-thionophosphoric acid ester, melts at 87 to 88° C. The yield is 70 g. (92% of theory).

*Analysis.*—Calculated for a molecular weight of 384: P, 8.07%; S, 8.34%; N, 10.92%; Cl, 18.49%. Found: P, 7.91%; S, 8.58%; N, 10.91%; Cl, 17.85%.

EXAMPLE 7

(III″)

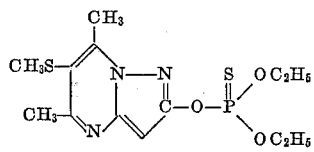

31.4 grams (0.15 mol) of 2-hydroxy-5,7-dimethyl-6-methylmercapto - pyrazolo - (1,5 - a) - pyrimidine are dissolved, together with 15.1 g. of triethylamine, in 300 cc. of acetonitrile. The reaction mixture is heated to 70–80° C., and mixed dropwise with 28.3 g. of 0,0-diethyl-thionophosphoric acid chloride. The mixture is heated at boiling temperature for 2 hours, then cooled to 20°C., and poured into 1.5 liters of water. The separated oil is taken up with methylene chloride and dried. After distilling off the solvent, the above compound, i.e., 0-[5,7-dimethyl-6-methylmercapto - pyrazolo - (1,5-a)-pyrimid-2-yl]-0,0-diethyl-thionophosphoric acid ester, is obtained in the form of a viscous oil. The yield is 47 g. (86.8% of theory).

*Analysis.*—Calculated for a molecular weight of 361: P, 8.6%; S, 17.71%; N, 11.62%. Found: P, 7.89%; S, 16.37%; N, 12.49%.

The following compounds can be prepared in an analogous manner:

Constitution                   Physical properties (IV‴)

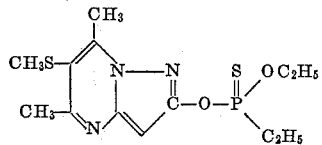

0-[5,7-dimethyl - 6 - methylmercapto-pyrazolo-(1,5-a)-pyrimid-2-yl]-ethyl-0-ethyl-thionophosphonic acid ester, M.P. 70 to 71° C.

(V″)

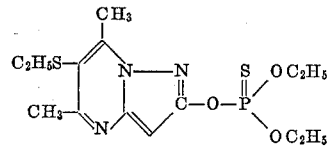

0-[5,7-dimethyl - 6 - ethylmercapto - pyrazolo - (1,5-a)-pyrimid-2-yl]-0,0-dimethyl-thionophosphoric acid ester Calc.: P, 8.27%; N, 11.20%; S, 17.18%. Found: P, 8.28%; N, 11.24%; S, 16.85%.

(XVI)

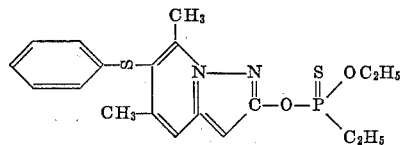

0-[5,7-dimethyl - 6 - phenylmercapto-pyrazolo-(1,5-a-)-pyrimid-2-yl]-ethyl-0-ethyl-thionophosphonic acid ester Calc.: P, 7.63%; S, 15.71%; N, 10.31%. Found: P, 8.47%; S, 16.09%; N, 9.78%.

(VII″)

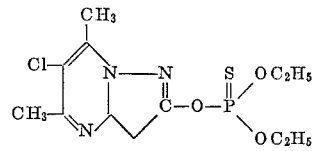

0-[3-bromo-5,7-dimethyl - 6 - chloro-pyrazolo-(1,5-a-)-pyrimid-2-yl]-0,0-diethyl-thionophosphoric acid ester (XVII)

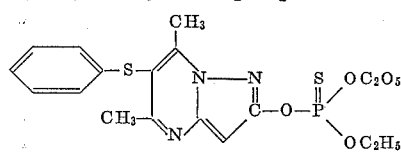

0-[5,7-dimethyl - 6 - phenylmercapto-pyrazolo-(1,5-a)-pyrimid-2-yl]-0,0-diethyl-thionophosphoric acid ester Calc.: P, 7.23%; S, 15.12%; N, 9.94%. Found: P, 7.54%; S, 15.54%; N, 10.57%.

EXAMPLE 8

Using the procedure of Example 4, with corresponding molar amounts of the following:

(a) 2-hydroxy-3-chloro - 6 - bromo-pyrazolo-(1,5-a)-pyrimidine and dimethyl-phosphinic acid chloride;

(b) 3-bromo-5-ethyl-6-sec.-butylmercapto-pyrazolo-(1,5-a)-pyrimidine and diethyl-thionophosphinic acid chloride;

(c) 6-(3′,4′ - dichlorophenyl) - mercapto-7-n-butyl-pyrazolo-(1,5-a)-pyrimidine and di-tert.-butyl - phosphinic acid chloride;

(d) 5,7-di-isopropyl - 6 - (3′-nitrophenyl) - mercapto-pyrazolo-(1,5-a)-pyrimidine and n-propyl-sec. - butyl-thiono-phosphonic acid chloride; and (e) 3-chloro-6-(4′-chlorophenyl) - mercapto - pyrazolo-(1,5-a)-pyrimidine and phenyl-0-isopropyl-phosphonic acid chloride;

the following products are obtained:

(a′) 0-[3-chloro - 6 - bromo-pyrazolo-(1,5-a)pyrimid-2-yl]-dimethyl-phosphinic acid ester;

(b′) 0-[3-bromo-5-ethyl-6-sec.-butylmercapto - pyrazolo-(1,5-a)-pyrimid-2-yl] - diethyl-thionophosphinic acid ester;

(c′) 0-[6-(3,′4′ - dichlorophenyl) - mercapto-7-n-butyl-pyrazolo-(1,5-a)-pyrimid-2-yl]-di-tert.-butyl-phosphinic acid ester;

(d′) 0 - [5,7-di-isopropyl-6-(3′-nitrophenyl) - mercapto-pyrazolo-(1,5-a) - pyrimid-2-yl]-n-propyl-0-sec.-butyl-thionophosphonic acid ester; and (e′) 0-[3-chloro-6-(4′-chlorophenyl)-mercapto-pyrazolo-(1,5-a)-pyrimid-2-yl]-phenyl-0-isopropyl - phosphonic acid ester.

Advantageously, in accordance with the present invention, in the foregoing formulae:

R and R′ each respectively represents hydrogen or alkyl having 1–3 carbon atoms, such as methyl, ethyl, n-propyl and iso-propyl;

R″ represents alkyl having 1-4 carbon atoms, such as methyl, ethyl, n-propyl, iso-propyl, n-butyl, iso-butyl, sec.-butyl, and tert.-butyl; or alkoxy having 1–4 carbon atoms, such as methoxy, ethoxy, n-propoxy, iso-propoxy, n-butoxy, iso-butoxy, sec.-butoxy and tert.-butoxy; or phenyl;

R‴ represents alkyl having 1-4 carbon atoms, such as methyl to tert.-butyl, inclusive; or alkoxy having 1–4 carbon atoms, such as methoxy to tert.-butoxy, inclusive, as specifically enumerated immediately hereinabove;

Y is sulfur or oxygen;

X is hydrogen or halogen, such as chloro, bromo, fluoro and iodo, preferably chloro and/or bromo; and X' is halogen, such as chloro, bromo, fluoro and iodo, preferably chloro and/or bromo; or alkylmercapto having 1–4 carbon atoms in the alkyl group, such as methyl-, ethyl-, n-propyl-, iso-propyl-, n-butyl-, iso-butyl-, sec.-butyl-, and tert.-butyl-, -mercapto; or phenylmercapto; or chloro-phenylmercapto; or di-chloro-phenylmercapto; or nitro-phenyl-mercapto; or methylphenylmercapto.

In accordance with a preferred feature of the invention, R and R' each respectively is alkyl having 1–3 carbon atoms, preferably methyl; R" is alkyl having 1–4 carbon atoms, or alkoxy having 1–4 carbon atoms, or phenyl, as noted above; R''' is alkyl having 1–4 carbon atoms, or alkoxy having 1–4 carbon atoms, as noted above; Y is oxygen or sulfur; X is hydrogen or chlorine or bromine; and X' is chlorine or bromine; or alkylmercapto having 1–4 carbon atoms in the alkyl chain, as noted above; or phenylmercapto; or chlorophenylmercapto; or methylphenylmercapto.

It will be realized by the artisan that all of the foregoing compounds contemplated by the present invention possess the desired pesticidal, especially insecticidal, acaricidal and anthelmintic, activity, all of such compounds possessing extremely low phytotoxicity as regards cultivated plants, as well as extremely low toxicity towards warm-blooded animals.

As contemplated herein, the terms "arthropod," "arthropodicidal" and "arthropodicide" may be defined as encompassing specifically both insects and acarids within the contemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in essence means an insecticidally or acaricidally effective amount of the active compound for the desired purpose. The anthelmintic activity in the same way refers to the combating of intestinal worms, and the like, and the concomitant combative or effective amount usable will be similarly an anthelmintically effective amount.

It will be appreciated that the instant specification and examples are set forth by way of illustration and not limitation, and that various modifications and changes may be made wtihout departing from the spirit and scope of the present invention.

What is claimed is:

1. 0-pyrazolo-(1,5-a)-pyrimidyl—phosphorus acid ester having the formula

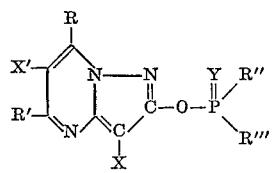

in which R and R' each respectively represents a member selected from the group consisting of hydrogen and alkyl having 1 to 3 carbon atoms, R" represents a member selected from the group consisting of alkyl having 1 to 4 carbon atoms, alkoxy having 1 to 4 carbon atoms, and phenyl, R''' represents a member selected from the group consisting of alkyl having 1 to 4 carbon atoms and alkoxy having 1 to 4 carbon atoms, Y represents a member selected from the group consisting of oxygen and sulfur, X represents a member selected from the group consisting of hydrogen and halogen, and X' represents a member selected from the group consisting of halogen, alkylmercapto having 1 to 4 carbon atoms, phenylmercapto, chlorophenyl mercapto, dichlorophenyl mercapto, nitrophenyl mercapto, and methylphenylmercapto.

2. Ester according to claim 1 wherein R is alkyl having 1 to 3 carbon atoms, R" is selected from the group consisting of alkyl having 1 to 4 carbon atoms, alkoxy having 1 to 4 carbon atoms, and phenyl, R''' represents a member selected from the group consisting of alkyl having 1 to 4 carbon atoms and alkoxy having 1 to 4 carbon atoms, Y represents a member selected from the group consisting of oxygen and sulfur, X is selected from the group consisting of hydrogen, chlorine and bromine, and X' is selected from the group consisting of chlorine, alkylmercapto having 1 to 4 carbon atoms, phenylmercapto, chlorophenylmercapto, and methylphenylmercapto.

3. Ester according to claim 1 wherein such compound is 0 - [5,7 - dimethyl - 6-methylmercapto-pyrazolo-(1,5-a)-pyramid - 2 - yl] - 0,0-diethyl thionophosphoric acid ester having the formula

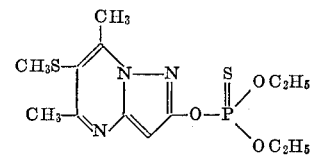

4. Ester according to claim 1 wherein such compound is 0 - [5,7 - dimethyl - 6-methylmercapto-pyrazolo-(1,5-a)-pyrimid - 2 - yl]-ethyl-0-ethyl-thionophosphonic acid ester having the formula

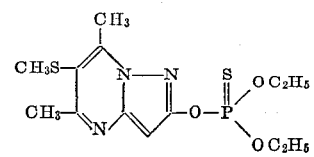

5. Ester according to claim 1 wherein such compound is 0 - [5,7 - dimethyl - 6 - ethylmercapto - pyrazolo-(1,5-a)-pyrimid - 2 - yl] - 0,0 - diethyl-thionophosphoric acid ester having the formula

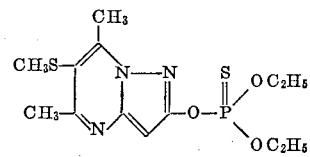

6. Ester according to claim 1 wherein such compound is 0 - [5,7 - dimethyl - 6-chloro-pyrazolo-(1,5-a)-pyrimid-2-yl]-ethyl-0-ethyl-thionophosphonic acid ester having the formula

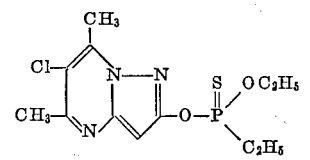

7. Ester according to claim 1 wherein such compound is 0 - [3 - bromo - 5,7 - dimethyl-6-chloro-pyrazolo-(1,5-a)-pyrimid-2-yl]-0,0-diethylthionophosphoric acid ester having the formula

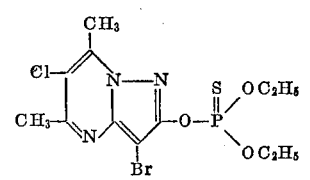

8. Ester according to claim 1 wherein such compound is O - [3 - bromo - 5,7 - dimethyl-6-chloro-pyrazolo-(1,5-a)-pyrimid-2-yl]-0,0-diethyl-phosphoric acid ester having the

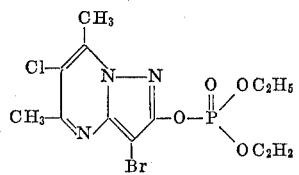

9. Ester according to claim 1 wherein such compound is O - [5,7 - dimethyl - 6-chloro-pyrazolo-(1,5-a)-pyrimid-2-yl] - 0,0 - diethyl-thionophosphoric acid ester having the formula

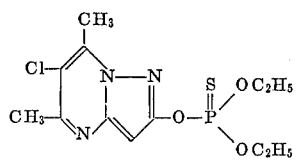

10. Ester according to claim 1 wherein such compound is O - [5,7 - dimethyl - y - chloro-pyrazolo-1,5-a)-pyrimid-2-yl]-methyl-0-ethyl-thionophosphonic acid ester having the formula

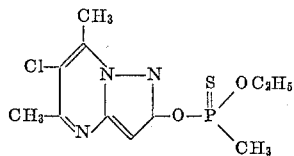

References Cited
UNITED STATES PATENTS
3,402,176  9/1968  Schicke _____ 260—256.4

ALEX MAZEL, Primary Examiner

R. J. GALLAGHER, Assistant Examiner

U.S. Cl. X.R.

260—256.4; 424—200

UNITED STATES PATENT OFFICE
CERTIFICATE OF CORRECTION

Patent No. 3,478,029          Dated Nov. 11, 1969

Inventor(s) Hans Gerd Schicke, deceased, by Emil Schicke and Helen Schicke, heirs, and Ingeborg Hammann It is certified that error appears in the above-identified patent and that said Letters Patent are hereby corrected as shown below:

Column 1, line 30, "phosphorous" should be --phosphorus--; line 69, delete "found" (first occurrence); column 2, line 68, correct the last part of the structural formula to read as follo

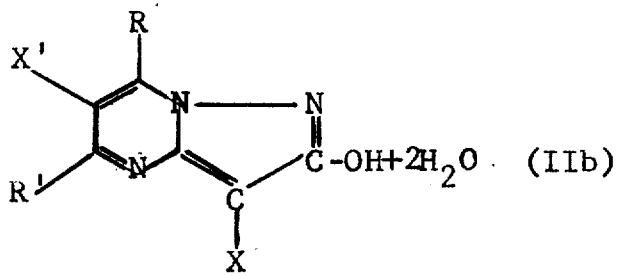

column 3, line 30, "bettles" should be --beetles--; line 31, "bettle" should be --beetle--; line 34, "(Melolonthat" should be --(Melolontha--; column 6, Table 2, first item in the last column, "1000" should be --100--; second item in said last column, insert --0--; column 7, correct the structural formula of (IV') to read as follows:

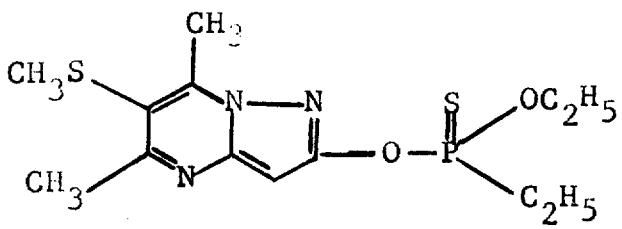

column 9, last column of the table, "95" should be --100--; column 13, lines 70-75, correct the structural formula to read as follows:

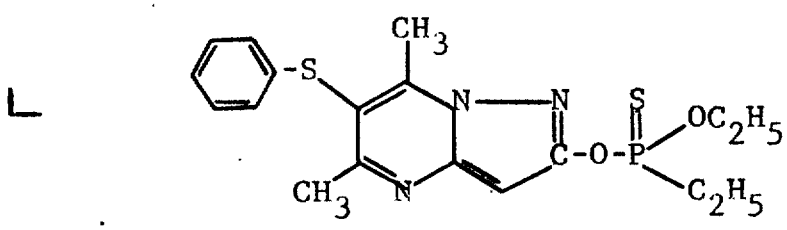

PO-1050
(5/69)

UNITED STATES PATENT OFFICE
CERTIFICATE OF CORRECTION

Patent No. 3,478,029     Dated Nov. 11, 1969

Inventor(s) Hans Gerd Schicke et al.

It is certified that error appears in the above-identified patent and that said Letters Patent are hereby corrected as shown below:

-2-

Column 14, lines 5-11, correct the structural formula to read as follows:

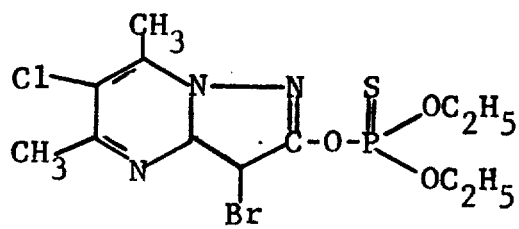

SIGNED AND
SEALED

JUN 16 1970

(SEAL)
Attest:

Edward M. Fletcher, Jr.
Attesting Officer

WILLIAM E. SCHUYLER, JR.
Commissioner of Patents